J. J., V. AND W. SEIBERT.
HOISTING ATTACHMENT FOR AUTOTRUCKS.
APPLICATION FILED SEPT. 3, 1920.
1,379,652.
Patented May 31, 1921.
2 SHEETS—SHEET 2.
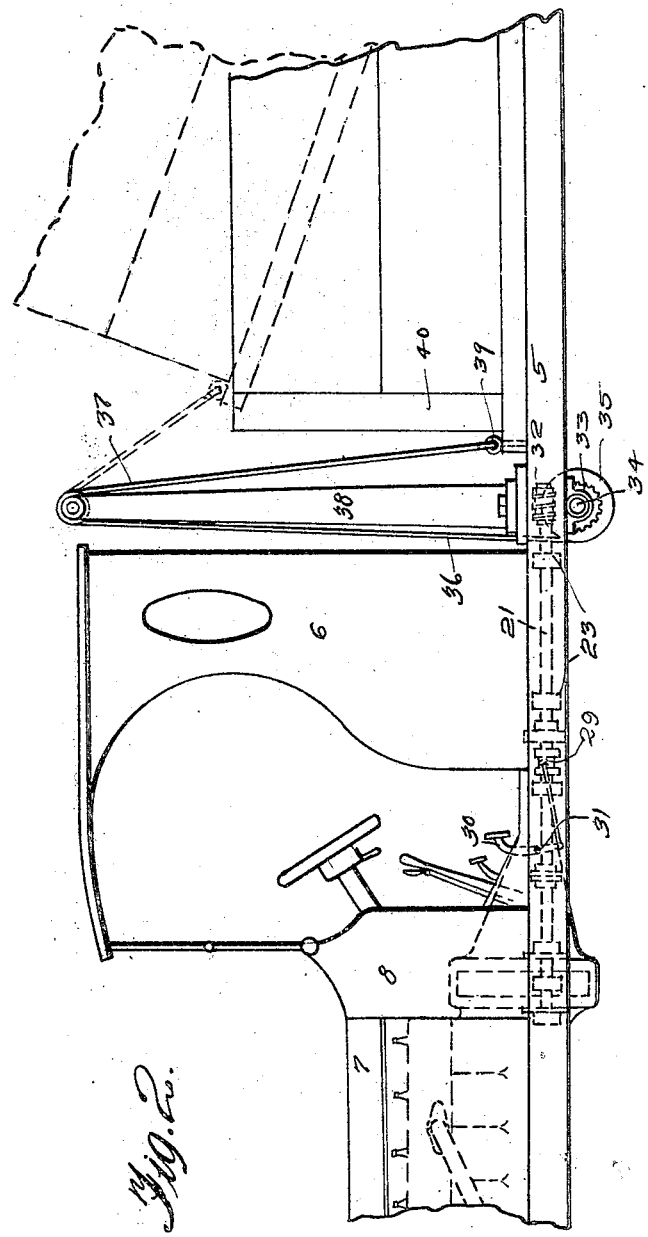
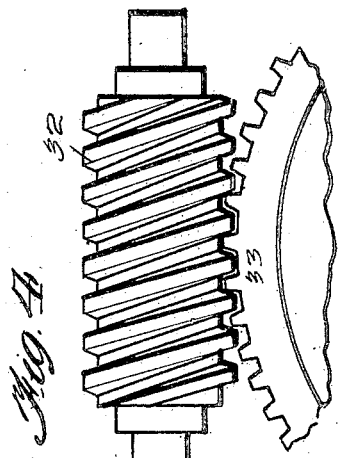
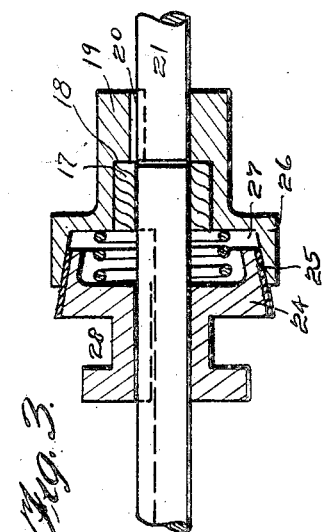
INVENTORS
Julius J. Seibert,
William Seibert,
Victor Seibert
BY
Shepherd & Campbell
ATTORNEYS.

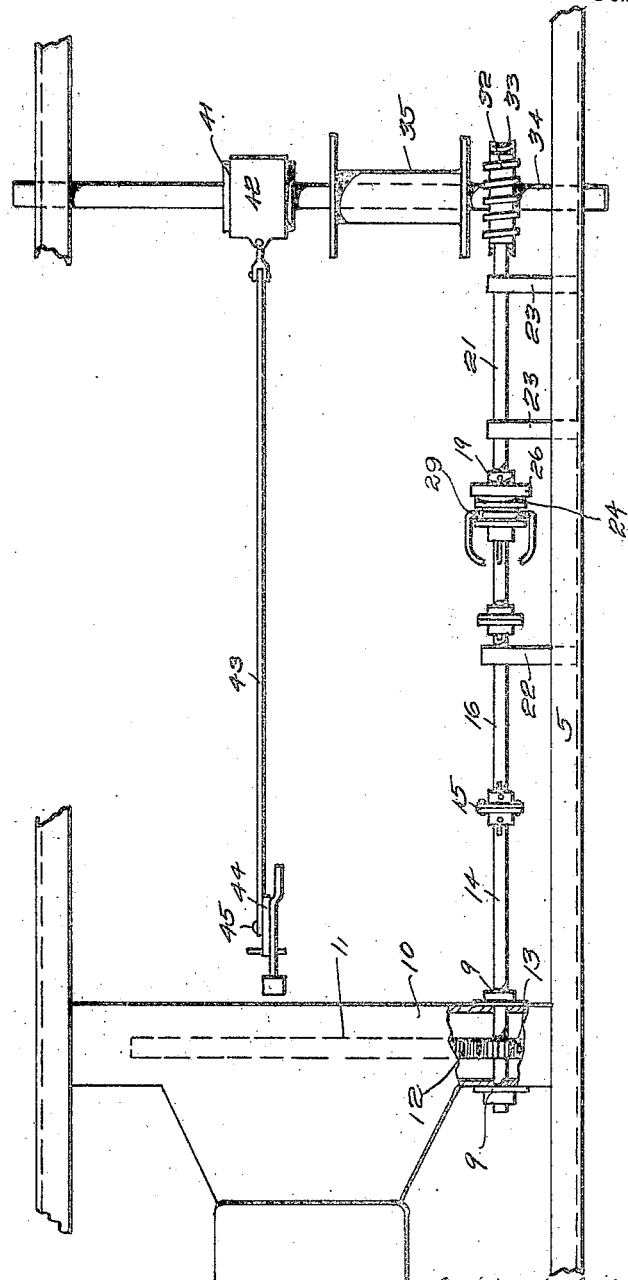

UNITED STATES PATENT OFFICE.

JULIUS J. SEIBERT, VICTOR SEIBERT, AND WILLIAM SEIBERT, OF McKEESPORT, PENNSYLVANIA.

HOISTING ATTACHMENT FOR AUTOTRUCKS.

1,379,652.  Specification of Letters Patent.  Patented May 31, 1921.

Application filed September 3, 1920. Serial No. 407,847.

*To all whom it may concern:*

Be it known that we, JULIUS J. SEIBERT, VICTOR SEIBERT, and WILLIAM SEIBERT, citizens of the United States, residing at McKeesport, in the county of Allegheny and State of Pennsylvania, have invented certain new and useful Improvements in Hoisting Attachments for Autotrucks, of which the following is a specification, reference being had therein to the accompanying drawings.

This invention relates to a hoisting attachment for automobile trucks and it has for its object to provide simple and economical means for transmitting power from the engine of an ordinary Ford truck to the body of the truck for the purpose of hoisting said body to dump the load.

Further objects and advantages of the invention will be set forth in the detailed description which now follows.

In the accompanying drawing:

Figure 1 is a plan view of parts of the chassis and associated elements;

Fig. 2 is a partial side elevation of a truck having the invention applied thereto;

Fig. 3 is a detail sectional view through a clutch hereinafter described; and

Fig. 4 is a detail view illustrating the drive to the shaft upon which the winding drum is mounted.

Like numerals designate corresponding parts in all of the figures of the drawing.

Referring to the drawing the numeral 5 designates the truck frame or chassis, 6 the cab, 7 the hood and 8 the dash, these parts being of the usual and well known construction.

As is well known the latest type of Ford engines have their fly wheels provided with spur gear teeth, these teeth being engaged by the starter. It is our intention to utilize this gear as an element of the connection by which motion is imparted to a winding drum, which in turn imparts movement to the truck body.

With this end in view, we provide bearing plates 9 that are secured to the fly gear case 10, within which the fly wheel 11 is mounted. This wheel carries gear teeth 12 upon its periphery and these teeth mesh with a smaller gear wheel 13 that is mounted upon a shaft section 14. The shaft section 14 is in turn mounted in the bearings 9 and is connected by the joint 15 with a shaft section 16. The rear end of the shaft section 16 is supported by roller bearings 17, that are mounted in a recess 18 of a clutch housing 19, said clutch housing being keyed at 20 upon a shaft section 21. The shaft section 16 is also supported by a bearing bracket 22 which projects from the chassis 5. The shaft section 21 is supported in bearing brackets 23 which project from the chassis 5. A clutch cone 24 is provided with a tapered face 25 that is adapted to make contact with the correspondingly shaped face 26 of a recess 27, formed in the clutch housing 19. This clutch cone is provided with an annular recess 28, which receives a yoke 29 that is adapted to have movement imparted to it by a foot lever 30 that is pivoted at 31. This foot lever may be operated by a driver seated in the cab and when its upper end is pressed forward its lower end will thrust rearwardly to bring the clutch cone into engagement with the clutch housing and thereby cause the shaft section 21 to be rotated from the shaft section 16, it being understood that the shaft sections 14 and 16 rotate whenever the engine is in motion.

The shaft section 21 carries a worm 32 which meshes with a worm gear 33 that is fast upon a transverse shaft 34, so that when the clutch is thrown into action rotation will be imparted to the shaft 34 from the engine and to a winding drum 35 that is fast upon said shaft. A cable 36 is wound upon the drum and passes over a pulley 37 upon the upper end of the standard 38. The opposite end of the cable is attached to an eye 39 of a tipping truck body 40. It is manifest that when the cable is wound upon the drum 35 the forward end of the body will be lifted to the dotted line position illustrated in Fig. 2, to thereby dump the load. To hold the truck body in elevated position and to control the lowering movement thereof, a brake drum 41 is mounted upon the shaft 34 and a brake band 42 coacts therewith in the usual and known way, said brake band being controlled by a brake rod 43 and a foot lever 44 to which said brake rod is pivoted at 45. Brakes of this character are quite common in automobile construction and the construction and operation of this brake will be apparent to anyone skilled in the art.

The clutch constituted by the elements 24 and 19 may also serve, in a measure, as a break, to control the lowering movement of the body, because it is apparent that if this clutch be thrown into engagement with the engine stopped and if the pitch of the worm gear be such as to permit it, the engine will be turned over as the truck body descends. However, we prefer the use of a separate brake as illustrated at 41, 42 and 43, to control the lowering movement of the truck body, because ordinarily it is not desirable to have the worm gear teeth of such pitch that reverse movement of the worm gear 33 would impart rotation to the worm 32, but upon the contrary it is desirable to have these teeth of such pitch that a very slow and powerful movement may be imparted to the drum 35, so that the load may be lifted without undue strain upon the engine.

From the foregoing description it will be seen that we have provided a very simple and inexpensive connection between elements already to be found upon a Ford engine and the truck body whereby to impart movement to said body from the engine.

It is to be understood, however, that the invention is not limited to the precise construction set forth but that it includes within its purview whatever changes fairly come within either the terms or the spirit of the appended claims.

Having described our invention, what we claim is:

The combination with a truck having an engine of the character specified wherein the fly wheel of the engine is toothed for engagement with a starter, of an oil tight housing inclosing said fly wheel, bearings carried by said housing, a shaft supported for rotation in said bearing and projecting from the interior of said housing to the exterior thereof, a pinion upon said shaft within the housing engaged with the teeth of the fly wheel, a tiltable body, a drum, a cable engaging the drum and the tiltable body and a worm drive between the shaft and said drum.

In testimony whereof we hereunto affix our signatures.

JULIUS J. SEIBERT.
VICTOR SEIBERT.
WILLIAM SEIBERT.